US007188010B2

(12) United States Patent

Kirschner

(10) Patent No.: US 7,188,010 B2

(45) Date of Patent: Mar. 6, 2007

(54) DEVICE AND METHOD FOR CONVERTING A DIAGNOSTIC INTERFACE TO SPI STANDARD

(75) Inventor: Manfred Kirschner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 156 days.

(21) Appl. No.: 10/477,812

(22) PCT Filed: Jun. 4, 2002

(86) PCT No.: PCT/DE02/02023

§ 371 (c)(1), (2), (4) Date: Nov. 12, 2003

(87) PCT Pub. No.: WO02/101349

PCT Pub. Date: Dec. 19, 2002

(65) Prior Publication Data

US 2004/0139369 A1 Jul. 15, 2004

(30) Foreign Application Priority Data

Jun. 13, 2001 (DE) ................................ 101 28 753

(51) Int. Cl.
*G01M 17/00* (2006.01)
*G06F 7/00* (2006.01)

(52) U.S. Cl. ................................ 701/29; 701/24; 710/1

(58) Field of Classification Search .................. 701/24, 701/29, 35; 710/1, 52, 61, 73; 327/212
See application file for complete search history.

(56) References Cited

U.S. PATENT DOCUMENTS

| | | | | |
|---|---|---|---|---|
| 5,311,138 | A * | 5/1994 | Ott et al. | 324/503 |
| 5,770,959 | A * | 6/1998 | Hopkins et al. | 327/143 |
| 6,266,710 | B1 * | 7/2001 | Dittmer et al. | 710/1 |
| 6,813,777 | B1 * | 11/2004 | Weinberger et al. | 725/76 |
| 2002/0163924 | A1 * | 11/2002 | Kim | 370/420 |

FOREIGN PATENT DOCUMENTS

| | | |
|---|---|---|
| DE | 40 32 926 | 4/1992 |
| DE | 19837242 | 3/2003 |
| EP | 0 857 616 | 8/1998 |
| WO | WO 91/16637 | 10/1991 |

* cited by examiner

*Primary Examiner*—Gertrude A. Jeanglaude
(74) *Attorney, Agent, or Firm*—Kenyon & Kenyon LLP

(57) ABSTRACT

A device to convert a diagnostic interface to standard SPI, which includes an electronic unit having a data input, a data output, a synchronization input, a clock input, and a register, and a buffer unit having a signal input, a signal output and an activation input. The data input and the data output of the electronic unit are connected to each other by a first data line. The data output for the electronic unit is connected to the signal input on the buffer unit by a second data line.

10 Claims, 1 Drawing Sheet

DEVICE AND METHOD FOR CONVERTING A DIAGNOSTIC INTERFACE TO SPI STANDARD

FIELD OF THE INVENTION

The invention relates to a device and a method for converting a diagnostic interface to standard SPI.

BACKGROUND INFORMATION

Control units in motor vehicles may be used, for example, to activate ignition end stages external to the control unit. To this end, the control units may be controlled by a microprocessor. To ensure faultless operation, it may be required to implement a watchdog function, i.e., to read out and analyze status reports or diagnostic information from the control unit and to initiate appropriate measures, if required.

A device for monitoring a motor vehicle testing system is referred to in German Published Patent Application No. 40 32 926. This device is understood to include a testing device and a portable diagnostic unit, which may be interconnected via an interface. Moreover, a monitoring device may be provided, which may be connected to the testing device via the interface instead of the diagnostic device.

The device may be a simple device for monitoring a motor vehicle system. The user may obtain information concerning whether a fault is present in the diagnostic device or within the testing device.

A device for monitoring the function of an electrical switch configured as an end stage, its connected consumer, its activation, and the associated connecting lines is described in European Published Patent No. 0 477 309.

The device is understood to have at least one fault detection logic connected parallel to the end stage. A reference potential may be applied to the connecting point between the switch and the consumer. In addition, the potentials of the input and output terminals of the end stage as well as the reference potential may be applied to the fault detection logic. Based on the applied potentials, the fault detection logic may differentiate between faults such as short-circuit to positive terminal, load shedding, and short-circuit to ground. Moreover, a supplementary circuit may be provided for the storage of the fault status and for a control unit to input a fault log.

The device described may reliably differentiate between possible fault cases such as short-circuit to ground, short-circuit to positive terminal and load shedding. Proper function of the consumer and its activation may also be recognized.

In the event of a short-circuit or load shedding of the electronic units or ICs (primarily end stages) contained in control units, the diagnostic information may be read out via a serial interface.

The diagnostic interface (DI) has a data input, a data output, an input for the clock signal (CLK), and an input for synchronization (SYNC). The communication between the microcontroller and the electronic unit via this interface may require the setting and erasing or reading out from ports.

The SPI interface (serial peripheral interface) may allow communication, for example, between a microprocessor and an electronic unit such as an IC.

The communication may begin with the microprocessor setting a synchronization input of the electronic unit using a slave select (SS). The synchronization input "low" may be set to start the communication.

The clock signal (CLK) used to synchronize the data transmission may then be applied. The data input of the electric unit may be identified as MOSI (master out slave in) and the data output as MISO (master in slave out).

In contrast to the diagnostic interface, the SPI interface may be supported by microcontrollers or microprocessors. Sending and receiving may be accomplished by writing into and reading from registers.

The operation of the diagnostic interface may result either in the programming of wait loops in order to observe the bit times or a function procedure call per bit in the case, for example, of operation in the 1 ms pattern. This may tie up a large amount of microprocessor resources, which should be avoided, if desired.

If, however, it is desired to utilize the advantages of SPI, then it may be required to redesign ICs in control units. For ICs for which there may be no reason for redesigning except for the interface, this may be expensive. The present invention proceeds from this point.

SUMMARY OF THE INVENTION

The diagnostic interface used may be located in the control unit and, in the case of a fault, may be used to assist the workshop entrusted with a repair in eliminating the fault. Furthermore, faults may be responded to even while driving. Faults detected may include, for example, fuel injection faults. Thus, for example, the gasoline injection for one cylinder may be suppressed if it is determined that no ignition spark is generated for that cylinder. Lambda regulation may also be suppressed.

For this purpose, the diagnostic interface may include a data input, a data output, an input for the clock signal and an input for synchronization.

The log of the diagnostic interface may be similar to the log of the SPI interface. Thus, the synchronization line (SYNC) may be used with the diagnostic interface or the slave select signal (SS) may be used with the SPI interface to address the module, and the diagnostic registers may be stored or output. In SPI, the data output of the diagnostic interface may send the data to the microprocessor, as in the case of MISO.

The data input of the diagnostic interface may be different, however, from the MOSI of the SPI interface. While the data input of the diagnostic interface may be used to cascade different slave modules, MOSI may be used to write data from the microprocessor to the slave module or modules. It is understood that this function was not available with modules having the diagnostic interface.

According to the present invention, the differences between the diagnostic interface and SPI may be taken into consideration, as is explained below.

If a line fault is recognized (short-circuit, load shedding), the data output is moved to "low" in ICs having a diagnostic interface. In ICs having SPI, the output may only be active, i.e., "low" or "high" if the module is addressed via SS. For that reason, a buffer unit may be connected at the data output of the electronic unit. The output then becomes tristate or active via a disable signal or an activation signal. The activation input or switching input of the buffer unit may be used for this purpose.

The output in the case of ICs having a diagnostic interface is an open collector. Therefore, a pullup resistor may be provided at the data output of the electronic unit if the logic level at the data input is not adequate or not present for reasons having to do with the baud rate.

The SPI interface may be configured for 2 to 5 Mbaud. It is understood that many ICs having a diagnostic interface are only configured for 500 kbaud. For that reason, when accessing the diagnostic interface, it may be required to switch over the baud accordingly.

In the case of the diagnostic interface, setting the SYNC outputs the first data bit. In SPI, this may not occur until the clock flank. Hence, when converting to SPI, the first data bit may be lost. Therefore, the data output may be required to be given to the data input. The cascading may then cause the lost data bit to be sent at the end. The microprocessor may be required to shift the received string by 1 bit or analyze the bits accordingly.

When a plurality of slave modules is cascaded, the data output of the last module which is connected to MISO may be required to be supplied to the data input of the first slave module.

An exemplary device according to the present invention for converting a diagnostic interface to standard SPI may have an electronic unit, for example, an IC of a control unit and a buffer unit. The electronic unit may include a data input, a data output, a synchronization input, a clock input and a register, such as, for example, a shift register. The diagnostic information intended to be read out may be stored in the register.

The buffer unit may have a signal input, a signal output and an activation input.

The data input and the data output of the electronic unit may be interconnected via a first data line. The data output of the electronic unit may be connected to the signal input of the buffer unit via a second data line.

The supplementary circuitry may permit the electronic unit having a conventional diagnostic interface to be connected to the SPI interface of a microcontroller.

In an exemplary embodiment of the device according to the present invention, the synchronization input of the electronic unit and the activation input of the buffer unit may be interconnected via a third data line. Thus, both inputs may be set simultaneously by applying a signal using the microprocessor.

If for reasons of the baud rate, the pullup, i.e., the logic level is not adequate or is not present at the data input of the electronic unit, a pullup resistor may be connected at the data output since the data output is an open collector.

An exemplary device according to the present invention may be cascadable. When a plurality of slave modules is cascaded, the data output of the last slave module may be supplied to the data input of the first slave module.

An exemplary method according to the present invention of converting a diagnostic interface to standard SPI may be implemented using an exemplary device as described above and a microprocessor.

Initially, the microprocessor may set the synchronization input of the electronic unit and the activation input of the buffer unit, i.e., the microprocessor may apply an active signal to these inputs. The inputs may be interconnected so that one signal of the microprocessor sets the two addressed inputs simultaneously.

In addition, a clock signal may be applied to the clock input of the electronic unit. The data in the shift register may be stored or output, synchronized with this clock signal.

The data may then be output from the shift register via the buffer unit, which is activated, and input from the microprocessor via the MISO.

The first data bit may be supplied by the first data output to the data input via the first data line and may thus be sent at the end. The microprocessor may accordingly analyze the read out data bits by shifting the received string by 1 bit, for example.

The supplementary circuit may allow the ICs to be connected to the SPI interface using the conventional diagnostic interface. Thus, ICs may be continued to be used so that, except for the interface, they may not need to be redesigned.

If the electronic unit is designed for a baud rate which does not correspond to that of the SPI interface of the microprocessor, the baud rate may be switched over accordingly by the microprocessor.

An computer program according to an exemplary embodiment of the present invention may include all program code required to execute all steps of the exemplary method according to the present invention. The computer program may be stored on suitable data media such as EEPROMs, flash memories or even CD-ROM, diskettes or hard disk drives. The computer program may run by an electronic central processing unit, the microprocessor, for example, in this case.

DETAILED DESCRIPTION

Figure 1:
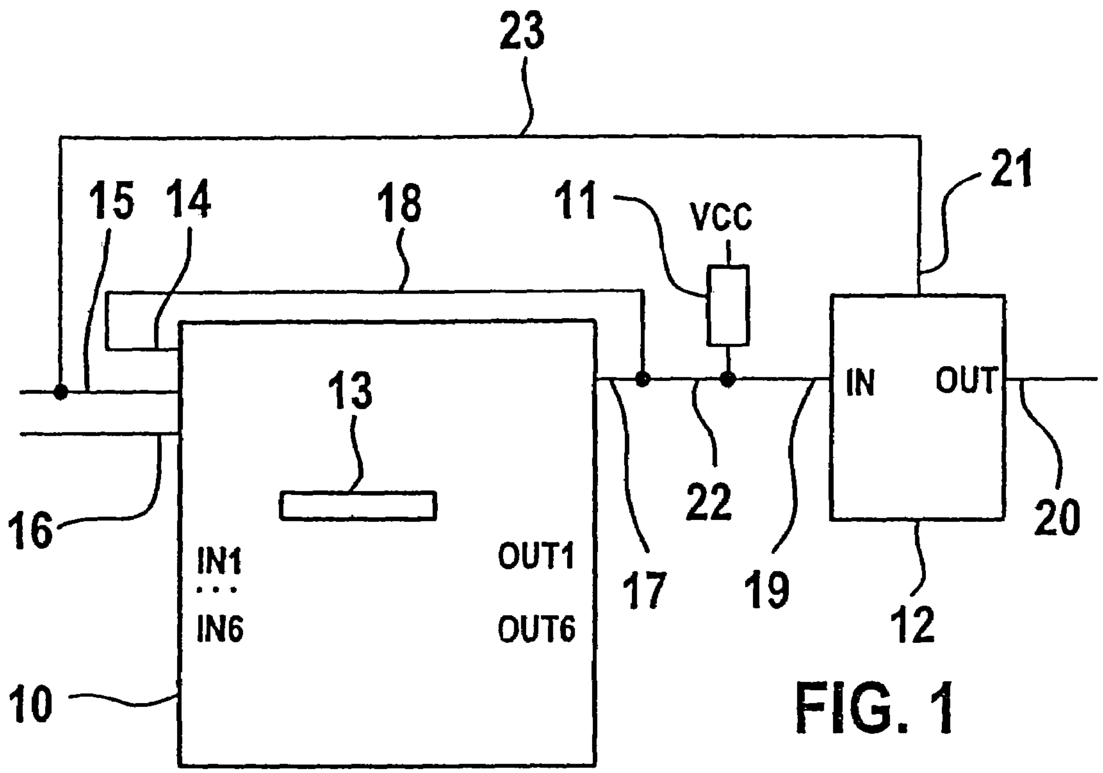
FIG. 1 shows an exemplary embodiment of a device according to the present invention in a schematic depiction.

FIG. 1 shows a device according to an exemplary embodiment of the present invention in a schematic depiction. An electronic unit is identified in its entirety as 10, a pullup resistor 11 and a buffer unit 12. Electronic unit 10 is used to activate ignition end stages external to the control unit. In this case, it may not be required to send data from the microprocessor to electronic unit 10. In the system shown, diagnostic data of electrical unit 10 which is stored in electronic unit 10 in a diagnostic register 13, such as, for example, a shift register, should be read out via the SPI.

To utilize the features of SPI for reading out from the diagnostic register, it may only be required to redesign electronic unit 10 only because of the interface. In addition to development costs, costs may arise through administration of a second type identification number and the number of different units.

In this case, a single gate may be used as buffer unit 12. If required at all, pullup resistor 11 should be in the range of 10 kOhm as a function of the desired baud rate.

Electronic unit 10 has a data input 14, a synchronization input 15, a clock input 16 and a data output 17. Data output 17 is connected to data input 14 via a first data line 18. Pullup resistor 11 is provided at data output 17, the pullup resistor being connected between data output 17 and supply voltage VCC.

Furthermore, electronic unit 10 has a series of inputs, which are identified here as IN1 through IN6, and a series of outputs, which are identified here as OUT1 through OUT6. The inputs may be used to communicate with the microprocessor.

They represent a parallel interface. The outputs may be used, for example, to activate ignition end stages.

Buffer unit 12 has a signal input 19, a signal output 20 and an activation input 21.

Signal input 19 of buffer unit 12 is connected to data output 17 of electronic unit 10 via a second data line 22.

Activation unit 21 is connected to synchronization input 15 of electronic unit 10 via a third data line 23.

Signal output 20 is used as MISO. Hence, the diagnostic data of the electronic unit is read out via signal output 20.

Figure 2:
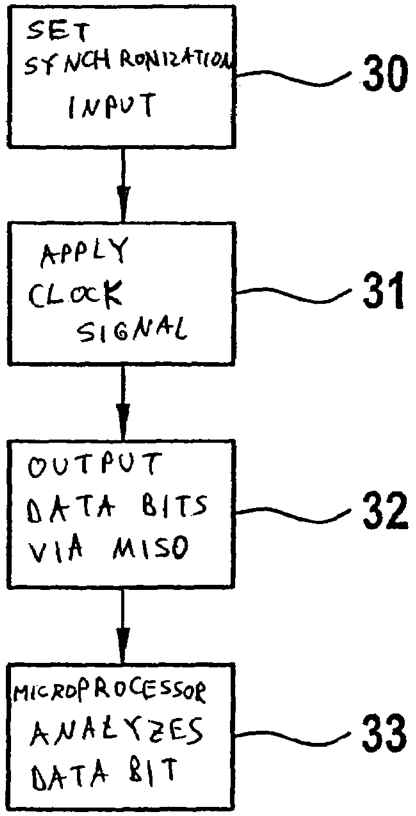
FIG. 2 shows an exemplary embodiment of a method according to the present invention in the form of a flowchart.

An exemplary method according to the present invention is shown in FIG. 2 in the form of a flowchart.

Synchronization input 15 is set in a first step 30. As a result, electronic unit 10 is addressed and buffer unit 12 is activated at the same time.

In a subsequent step 31, a clock signal is applied. This is used to synchronize the data input and data output.

In a further step 32, the data bits are output via MISO, the first data bit being output last.

In a subsequent step 33, the data bit that represents diagnostic information is analyzed by the microprocessor.

The use of the SPI interface by ICs having a standard interface may prove to be desirable. Thus, the hardware support of the SPI interface may be utilized. In addition, pins on the microprocessor may be saved. In particular, ICs having a conventional diagnostic interface may be continued to be used if there are no other functional reasons that would make it required to redesign the IC.

What is claimed is:

1. A device for converting a diagnostic interface to standard SPI, comprising:

an electronic unit having a data input, a data output, a synchronization input, a clock input and a register;

a buffer unit having a signal input, a signal output and an activation input;

a first data line to interconnect the data input and the data output of the electronic unit, wherein the first data line is a feedback line from the data output to the data input; and a second data line to connect the data output of the electronic unit to the signal input of the buffer unit.

2. The device of claim 1, further comprising:

a third data line to interconnect the synchronization input of the electronic unit and the activation input of the buffer unit.

3. The device of claim 1, further comprising:

a pullup resistor connected at the data output of the electronic unit.

4. The device of claim 1, wherein the device is cascadable using devices of the same type.

5. A method performed by a microprocessor to convert a diagnostic interface to standard SPI, comprising:

setting a synchronization input of an electronic unit and an activation input of a buffer unit;

feeding a clock signal to a clock input of the electronic unit;

subsequently reading out, via an signal output of the buffer unit, a number of data bits stored in a register of the electronic unit, a first data bit being supplied from a data output to a data input of the electronic unit via a first data line so that it is sent at the end; and analyzing the read-out data bits.

6. The method of claim 5, further comprising:

switching over a baud rate.

7. A computer program comprising:

program code for executing a method to convert a diagnostic interface to standard SPI when the computer program is run on at least one of a computer and a corresponding central processing unit, the method including:

setting a synchronization input of an electronic unit and an activation input of a buffer unit;

feeding a clock signal to a clock input of the electronic unit;

subsequently reading out, via an signal output of the buffer unit, a number of data bits in a register of the electronic unit, a first data bit being supplied from a data output to a data input of the electronic unit via a first data line so that it is sent at the end; and analyzing the read-out data bits.

8. The computer program of claim 7, wherein the central processing unit includes a microprocessor.

9. A computer program product comprising:

program code stored on a computer-readable data medium for executing a method to convert a diagnostic interface to standard SPI when the computer program is run on at least of a computer and a corresponding central processing unit, the method including:

setting a synchronization input of an electronic unit and an activation input of a buffer unit;

feeding a clock signal to a clock input of the electronic unit;

subsequently reading out, via an signal output of the buffer unit, a number of data bits stored in a register of the electronic unit, a first data bit being supplied from a data output to a data input of the electronic unit via a first data line so that it is sent at the end; and analyzing the read-out data bits.

10. The computer program product of claim 9, wherein the corresponding central processing unit includes a microprocessor.

* * * * *